(12) United States Patent
Han

(10) Patent No.: US 10,069,961 B2
(45) Date of Patent: Sep. 4, 2018

(54) TERMINAL OPERATING MODE ADJUSTMENT METHOD AND APPARATUS AND COMPUTER READABLE STORAGE MEDIUM

(71) Applicant: ZTE CORPORATION, Shenzhen (CN)

(72) Inventor: Gang Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/322,315

(22) PCT Filed: Sep. 19, 2014

(86) PCT No.: PCT/CN2014/086907
§ 371 (c)(1),
(2) Date: Apr. 10, 2017

(87) PCT Pub. No.: WO2015/196592
PCT Pub. Date: Dec. 30, 2015

(65) Prior Publication Data
US 2017/0223169 A1 Aug. 3, 2017

(30) Foreign Application Priority Data
Jun. 27, 2014 (CN) .......................... 2014 1 0302000

(51) Int. Cl.
*H04M 1/725* (2006.01)
*H04L 12/26* (2006.01)
(Continued)

(52) U.S. Cl.
CPC ........ *H04M 1/72569* (2013.01); *H04L 43/16* (2013.01); *H04M 1/72544* (2013.01);
(Continued)

(58) Field of Classification Search
CPC . H04M 1/725; H04M 1/72544; H04W 52/02; H04W 4/02; H04W 84/04; H04L 43/16; H04L 12/26
See application file for complete search history.

(56) References Cited

U.S. PATENT DOCUMENTS

| 8,504,114 B1 * | 8/2013 | Tseng | H04M 19/041 455/418 |
| 2004/0029621 A1 * | 2/2004 | Karaoguz | H04B 1/1615 455/574 |
| 2008/0036591 A1 * | 2/2008 | Ray | H04M 1/72569 340/540 |

FOREIGN PATENT DOCUMENTS

| CN | 101330539 A | 12/2008 |
| CN | 102006356 A | 4/2011 |

(Continued)

OTHER PUBLICATIONS

PCT International Search Report dated Apr. 1, 2015, Application No. PCT/CN2014/086907, 3 Pages.
(Continued)

*Primary Examiner* — Frantz Bataille
(74) *Attorney, Agent, or Firm* — Plumsea Law Group, LLC

(57) ABSTRACT

The present disclosure discloses a method for regulating a working mode of a terminal. The method includes that: acquiring an environmental information parameter, determining a preferred working mode of the terminal according to the environmental information parameter, and switching to the preferred working mode. The present disclosure also discloses a device for regulating a working mode of a terminal.

12 Claims, 4 Drawing Sheets

(51) Int. Cl.
*H04W 4/02* (2018.01)
*H04W 52/02* (2009.01)
*H04W 84/04* (2009.01)

(52) U.S. Cl.
CPC ....... *H04W 4/027* (2013.01); *H04W 52/0251* (2013.01); *H04W 84/042* (2013.01)

(56) References Cited

FOREIGN PATENT DOCUMENTS

| | | |
|---|---|---|
| CN | 102413547 A | 4/2012 |
| CN | 103414825 A | 11/2013 |
| GB | 2358112 A | 7/2001 |
| WO | 0013428 A2 | 3/2000 |
| WO | 2013029568 A1 | 3/2013 |

OTHER PUBLICATIONS

PCT Written Opinion of the International Searching Authority dated Apr. 1, 2015, Application No. PCT/CN2014/086907, Applicant ZTE Corporation, 4 Pages.

Extended European Search Report dated Jun. 6, 2017, Application No. 14895930.7-1879 / 3163853, Applicant ZTE Corporation, 9 Pages.

\* cited by examiner

TERMINAL OPERATING MODE ADJUSTMENT METHOD AND APPARATUS AND COMPUTER READABLE STORAGE MEDIUM

CROSS-REFERENCE TO RELATED APPLICATIONS

This application is a U.S. national phase of PCT Application No. PCT/CN2014/086907 filed on Sep. 19, 2014, which claims priority to Chinese Patent Application No. 201410302000.7 filed on Jun. 27, 2014, the disclosures of which are incorporated in their entirety by reference herein.

TECHNICAL FIELD

The present disclosure relates to a wireless communication technology, and more particularly to a method and device for regulating a working mode of a terminal and a computer-readable storage medium.

BACKGROUND

Along with rapid development of a Long Term Evolution LTE network throughout the world, the same operating company may usually provide coverage of multiple networks such as a 2nd-Generation 2G such as a Global System for Mobile Communication GSM network, a 3rd-Generation 3G network such as a Wideband Code Division Multiple Access WCDMA network, and an LTE network, etc. in many countries. Considering multiple aspects of cost, construction speed and the like, networks of operating companies in various countries cannot perfectly support Voice over LTE, VoLTE, at the present stage, and there is still a distance from quality of a voice call, particularly stability, compared with a conventional GSM network.

In addition, with development of an intelligent terminal, a more powerful Central Processing Unit CPU and a large screen consume a lot of standby time, which makes a problem about power consumption become an increasingly important consideration, and a dual-standby technology and the like may bring great power consumption.

At present, a terminal user usually manually selects a network, and such a selection manner is relatively more tedious. Moreover, the user can usually not select the most proper network due to lack of related technical knowledge. In addition, at present, selection of the user over a terminal network is usually selection over a network system (i.e. 2G, 3G, LTE, etc.), and the user may not be authorized by a terminal manufacturer to freely change a more detailed network parameter.

SUMMARY

To solve the existing technical problem, embodiments of the present disclosure are intended to provide a method and device for regulating a working mode of a terminal and a computer-readable storage medium.

The technical solutions of embodiments of the present disclosure are implemented as follows.

An embodiment of the present disclosure provides a method for regulating a working mode of a terminal, which includes that:

acquiring an environmental information parameter of the terminal, determining a preferred working mode of the terminal according to the environmental information parameter, and switching to the preferred working mode.

In the abovementioned solution, the environmental information parameter includes: a sensor parameter and a network information parameter;

the sensor parameter includes: a movement speed of the terminal, an on time and frequency of a screen and a quantity of power of the terminal; and the network information parameter includes: a time length and frequency of a voice call, a time length and traffic of a data traffic service and a using state of a data connection service.

In the abovementioned solution, the preferred working mode includes at least one of the following modes: a conference mode, a power-saving mode, a call service preferred mode, a data traffic service preferred mode, a call and data traffic service concurrent mode, a game mode and a mobile mode.

In the abovementioned solution, determining the preferred working mode of the terminal includes:

judging whether the terminal is operated;

determining the terminal to enter the conference mode when the terminal is not operated;

judging whether the terminal requires a call service and/or the data traffic service when the terminal is operated;

determining the terminal to enter the power-saving mode when the terminal does not require the call service and/or the data traffic service;

judging whether there is a game being played on the terminal after the terminal enters the power-saving mode;

determining the terminal to enter the game mode when a certain game is being played on the terminal; and ending a current flow when no game is being played on the terminal.

In the abovementioned solution, the method further includes that:

judging whether the network information parameter meets a preset condition when the terminal requires the call service and/or the data traffic service;

herein, the preset condition includes: preset condition 1: a historical call frequency of the terminal is higher than a preset threshold value, preset condition 2: a historical data traffic service using frequency of the terminal is higher than a preset threshold value, and preset condition 3: the using state of the data connection service is connection;

determining the terminal to enter the call service preferred mode when preset condition 1 is met but preset condition 2 is not met, or, preset condition 3 is met; determining the terminal to enter the data traffic service preferred mode when preset condition 2 is met but preset condition 1 is not met; and determining the terminal to enter the call and data traffic service concurrent mode when preset condition 1 is met and preset condition 2 is met.

In the abovementioned solution, after the terminal enters the call service preferred mode, or the data traffic service preferred mode, or the call and data traffic service concurrent mode, determining the preferred working mode by a preferred working mode determination module further includes that:

judging whether the terminal is moving at a high speed;

determining the terminal to enter the mobile mode when the terminal is moving at the high speed;

judging whether there is a game being played on the terminal;

determining the terminal to enter the game mode when a certain game is being played on the terminal, otherwise ending the current flow;

judging whether there is a game being played on the terminal when the terminal is not moving at the high speed; and determining the terminal to enter the game mode when a certain game is being played on the terminal, otherwise ending the current flow.

The embodiment of the present disclosure provides a device for regulating a working mode of a terminal, which includes: an environmental information parameter acquisition module, a preferred working mode determination module and a mode switching module, herein the environmental information parameter acquisition module is arranged to acquire an environmental information parameter;

the preferred working mode determination module is arranged to determine a preferred working mode according to the environmental information parameter; and the mode switching module is arranged to execute a mode switching after the preferred working mode is determined.

In the abovementioned solution, the environmental information parameter includes: a sensor parameter and a network information parameter;

the sensor parameter includes: a movement speed of the terminal, an on time and frequency of a screen and a quantity of power of the terminal; and the network information parameter includes: a time length and frequency of a voice call, a time length and traffic of a data traffic service and a using state of a data connection service.

In the abovementioned solution, the preferred working mode includes at least one of the following modes: a conference mode, a power-saving mode, a call service preferred mode, a data traffic service preferred mode, a call and data traffic service concurrent mode, a game mode and a mobile mode.

In the abovementioned solution, determining the preferred working mode by the preferred working mode determination module includes that:

judging whether the terminal is operated;

determining the terminal to enter the conference mode when the terminal is not operated;

judging whether the terminal requires a call service and/or the data traffic service when the terminal is operated;

determining the terminal to enter the power-saving mode when the terminal does not require the call service and/or the data traffic service;

judging whether there is a game being played on the terminal after the terminal enters the power-saving mode;

determining the terminal to enter the game mode when a certain game is being played on the terminal; and ending a current flow when no game is being played on the terminal.

In the abovementioned solution, determining the preferred working mode by the preferred working mode determination module further includes that:

judging whether the network information parameter meets a preset condition when the terminal requires the call service and/or the data traffic service;

herein, the preset condition includes: preset condition 1: a historical call frequency of the terminal is higher than a preset threshold value, preset condition 2: a historical data traffic service using frequency of the terminal is higher than a preset threshold value, and preset condition 3: the using state of the data connection service is connection;

determining the terminal to enter the call service preferred mode when preset condition 1 is met but preset condition 2 is not met, or, preset condition 3 is met; determining the terminal to enter the data traffic service preferred mode when preset condition 2 is met but preset condition 1 is not met; and determining the terminal to enter the call and data traffic service concurrent mode when preset condition 1 is met and preset condition 2 is met.

In the abovementioned solution characterized in that, after the terminal enters the call service preferred mode, or the data traffic service preferred mode, or the call and data traffic service concurrent mode, determining the preferred working mode by the preferred working mode determination module further includes that:

judging whether the terminal is moving at a high speed;

determining the terminal to enter the mobile mode when the terminal is moving at the high speed;

judging whether there is a game being played on the terminal;

determining the terminal to enter the game mode when a certain game is being played on the terminal, otherwise ending the current flow;

judging whether there is a game being played on the terminal when the terminal is not move at the high speed; and determining the terminal to enter the game mode when a certain game is being played on the terminal, otherwise ending the current flow.

The embodiment of the present disclosure further provides a computer-readable storage medium, which includes a set of computer-executable instructions, herein the instructions are configured to execute the method for regulating the working mode of the terminal provided by any abovementioned embodiment of the present disclosure.

The embodiment of the present disclosure provides the method and device for regulating the working mode of the terminal and the computer-readable storage medium. The environmental information parameter is acquired, and the preferred working mode of the terminal is determined according to the environmental information parameter, and the terminal is switched to the preferred working mode. In such a manner, a current and future state of the terminal may be comprehensively analyzed according to multiple environmental information parameters, and both a real-time requirement of the terminal and changes in the environmental information parameters of the terminal are considered, so that the preferred working mode suitable for the terminal is determined, and user experiences are greatly improved.

SPECIFIC EMBODIMENTS

In embodiments of the present disclosure, an environmental information parameter is acquired, and a preferred working mode of a terminal is determined according to the environmental information parameter, and a working mode of the terminal is switched to the preferred working mode.

The present disclosure will be further described below with reference to the drawings and specific embodiments in detail.

Figure 1:
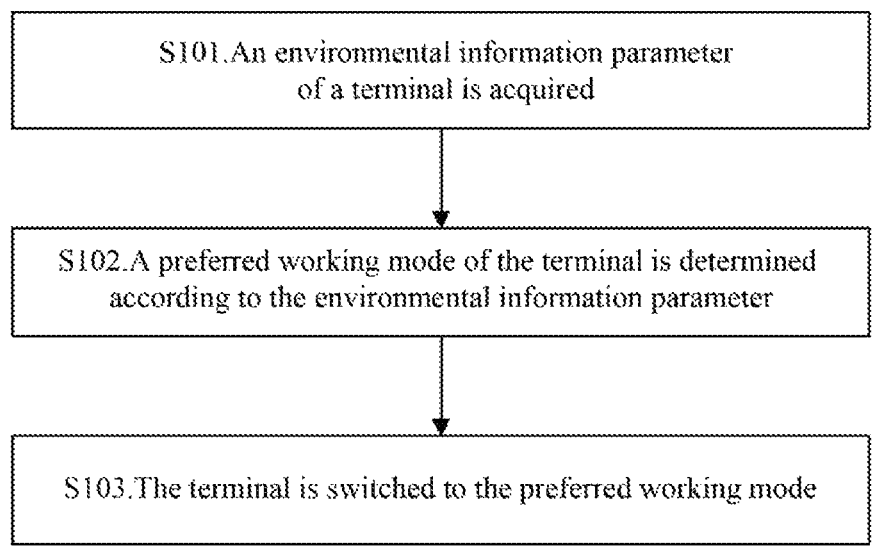
FIG. 1 is a flowchart 1 of a method for regulating a working mode of a terminal according to an embodiment of the present disclosure.
Figure 2:
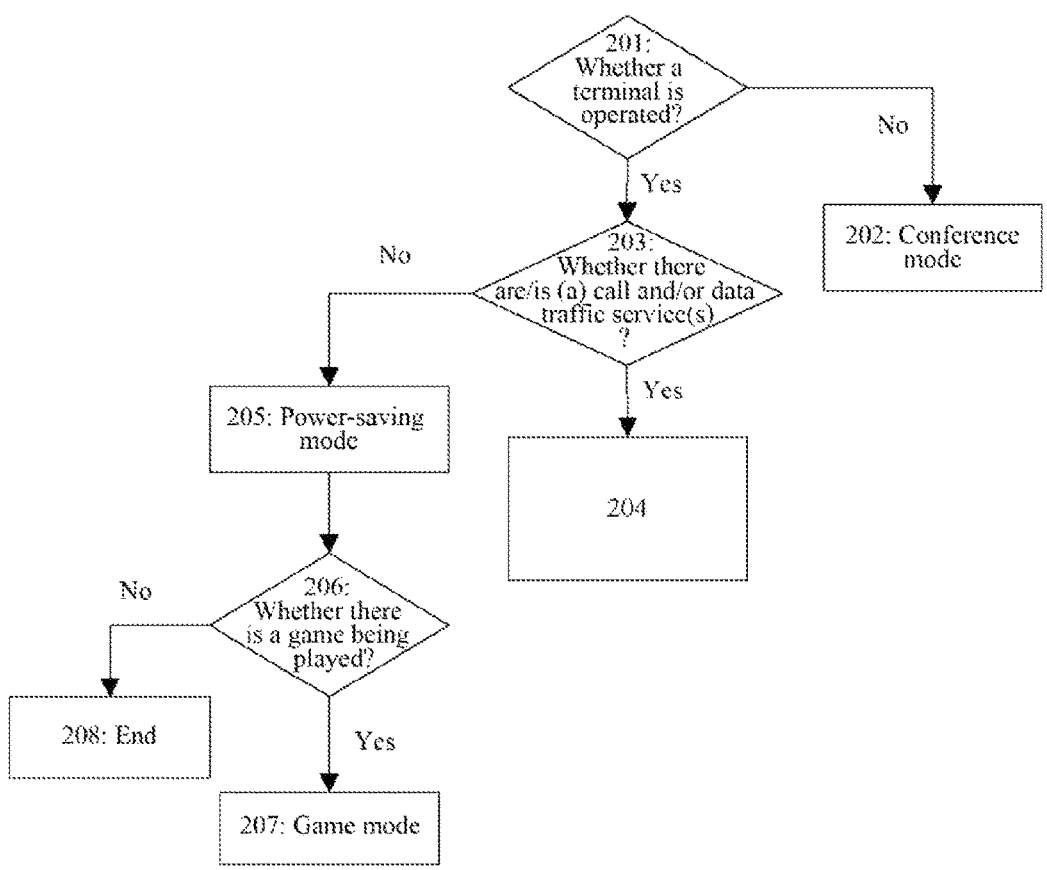
FIG. 2 is a flowchart 2 of a method for regulating a working mode of a terminal according to an embodiment of the present disclosure.

An embodiment of the present disclosure implements a method for regulating a working mode of a terminal, and as shown in FIG. 1, the method mainly includes the following steps.

In step S101, an environmental information parameter of the terminal is acquired.

The environmental information parameter includes: a sensor parameter and a network information parameter.

Herein, the sensor parameter includes: a movement speed of the terminal, an on time and frequency of a screen and a quantity of power of the terminal; and the network information parameter includes: a time length and frequency of a voice call, a time length and traffic of a data traffic service and a using state of a data connection service.

In step S102, a preferred working mode of the terminal is determined according to the environmental information parameter.

The preferred working mode includes at least one of the following modes: a conference mode, a power-saving mode, a call service preferred mode, a data traffic service preferred mode, a call and data traffic service concurrent mode, a game mode and a mobile mode.

The step that the preferred working mode of the terminal according to the environmental information parameter is determined includes the following steps.

In step 201: whether the terminal is operated is judged.

In the step, whether the terminal is operated may be judged according to a comparison result of the on time $t_1$ of the screen and the on frequency pi of the screen and preset threshold values. The on time threshold value of the screen may be preset to be $T_1$, and the on frequency threshold value of the screen may be set to be $P_1$. When $t_1 < T_1$ and $p_1 < P_1$, it is determined that the terminal is not operated, and step 202 is executed for continuous processing. Otherwise, it is determined that the terminal is operated, and step 203 is executed for continuous processing.

In the step, the preset threshold values $T_1$ and $P_1$ may be set according to a practical requirement. For example, $T_1$ may be set to be 5 min and $P_1$ may be set to be 1/10 min, and this means that it is determined that the terminal is not operated when the on frequency of the screen is lower than 1/10 min and a time length for which the screen is turned on each time does not exceed 5 minutes.

In step 202, the terminal enters the conference mode.

Before the step is executed, it has been determined that the terminal is not operated in step 201. After entering the conference mode, the terminal executes one or any combination of the following operations: regulating a ringing manner into a vibration mode, regulating the ringing manner into a silent mode, disabling data traffic, disabling Wireless Fidelity WIFI, disabling Bluetooth, selecting a communication network with lower power consumption, rejecting an incoming call and automatically replying a short message.

A user may also set an operation required to be executed in the conference mode according to his/her requirement.

In step 203, whether the terminal requires a call service and/or the data traffic service is judged.

Here, the data traffic service refers to: a service that the terminal surfs the Internet by virtue of a communication technology such as General Packet Radio Service (GPRS), or Enhanced Data Rate for GSM Evolution (EDGE), or Time Division-Synchronous Code Division Multiple Access (TD-SCDMA), or WCDMA or High Speed Downlink Packet Access (HSDPA), etc. or uses another related value-added service and data traffic is generated; and the data traffic service is different from the data connection service, and the data connection service mainly refers to a service such as WIFI and a Bluetooth sharing network, etc.

Here, whether the terminal requires the call service and/or the data traffic service may be judged in multiple manners. It needs to be noted that not whether a current state of the terminal is using the call service and/or the data traffic service but whether the terminal requires the call service and/or the data traffic service is judged. Therefore, it is required to predict a working state of the terminal in a future time period through a network parameter. In practice, the working state of the terminal in the future time period may be predicted in multiple manners, one feasible manner is provided here, and other solutions will not be listed one by one.

For example, whether the terminal requires the call service and/or the data traffic service may be judged according to a comparison result of a historical call frequency of the terminal or a historical data traffic service using frequency of the terminal and a preset threshold value. When the historical call frequency $p_2$ of the terminal is lower than the preset threshold value $P_2$ and the historical data traffic service using frequency $p_3$ of the terminal is lower than the preset threshold value $P_3$, it is determined that the terminal does not require the call service and/or the data traffic service, and at this moment, step 205 is executed. Otherwise, it is determined that the terminal requires the call service and/or the data traffic service, and at this moment, step 204 is executed.

In step 205, the terminal enters the power-saving mode.

Before the step is executed, it has been determined that the terminal is not operated in the step 201. After entering the power-saving mode, the terminal executes one of or any combination of the following operations: regulating the ringing manner into the vibration mode, regulating the ringing manner into the silent mode, disabling data traffic, disabling WIFI, disabling Bluetooth and selecting the communication network with lower power consumption.

In step 206, whether there is a game being played on the terminal is judged. Gaming is a common function of a terminal at present. In a gaming process, a game program usually is executed on the terminal in a full screen manner Under such a condition, the terminal is usually switched into a call interface directly and jumps from the game when an incoming call is received. However, such a direct game interruption manner makes user experiences relatively poorer in some scenarios; and even more, when a memory is excessively occupied and a CPU runs with a high load in a game execution process of the terminal, the forcibly popped-up call interface usually causes breakdown and restart or complete halting of the terminal.

To solve the problem, in step 206, whether there is a game being played on the terminal is judged after the user enters the power-saving mode. Whether there is a game being played on the terminal may be judged in multiple manners. For example, whether there is a game program currently running at present in the terminal or whether the CPU runs at a high speed is judged. It is determined that a certain game is being played on the terminal when at least one of the abovementioned two conditions occurs, and at this moment, step 207 is executed; otherwise, step 208 is executed to end a current flow.

In step 207, the terminal enters the game mode.

After the corresponding operation in the power-saving mode has been executed in step 205, and in the step, the terminal executes a corresponding operation in the game mode. The operation required to be executed in the game mode may include at least one of the following operations: automatically hanging up the phone, or automatically hanging up the phone and replying a preset content, or prompting a user to select a processing manner with a small window; and when the terminal executes the operation of automatically hanging up the phone, the terminal reserves a call record, and the user may dial back a telephone number in the call record when stopping playing the game.

Selectable processing manners include: answering the phone, or automatically hanging up the phone, or automatically hanging up the phone and replying the preset content; and selection of the user may be recorded as a default operation in a currently running application program according to a name of the program, and the default operation is directly executed when the same application program runs next time.

Figure 3:
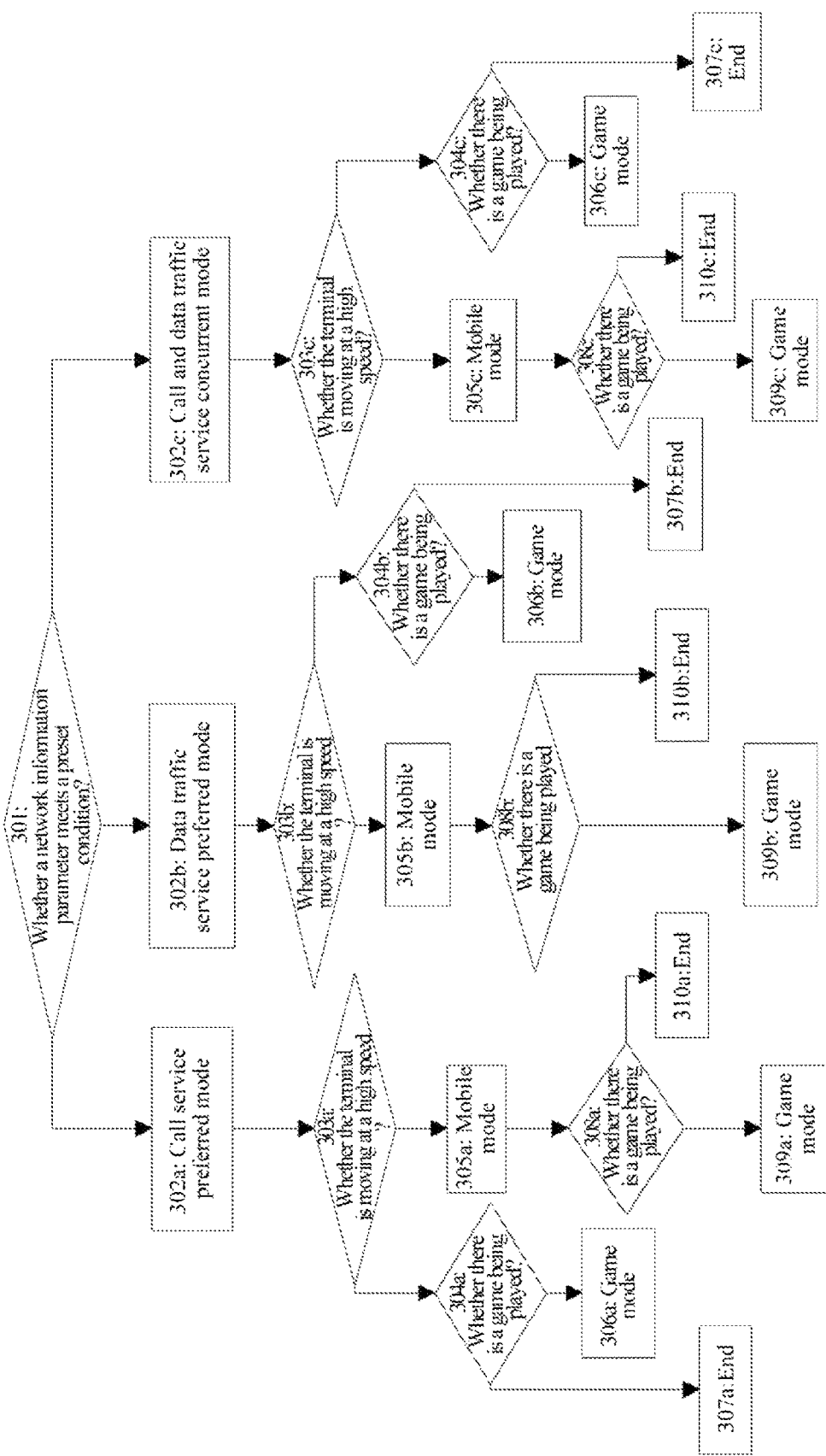
FIG. 3 is a flowchart 3 of a method for regulating a working mode of a terminal according to an embodiment of the present disclosure.

In step 204, when it is determined that the terminal requires the call service and/or the data traffic service before Step 204, a processing flow is executed for mode selection of the terminal in step 204. The processing flow, as shown in FIG. 3, mainly includes the following steps.

In step 301, whether the network information parameter meets a preset condition is judged.

The network information parameter includes: the historical call frequency $p_2$ of the terminal, the historical data traffic service using frequency $p_3$ of the terminal, and the using state of the data connection service. The using state of the data connection service includes: a connected or disconnected state of the data connection service such as the WIFI and the Bluetooth sharing network, etc.

The preset condition includes: preset condition 1: the historical call frequency $p_2$ of the terminal is higher than the preset threshold value $P_2$, preset condition 2: the historical data traffic service using frequency $p_3$ of the terminal is higher than the preset threshold value $P_3$, and preset condition 3: the using state of the data connection service is connection.

Step 302 is executed when preset condition 1 is met but preset condition 2 is not met, or, preset condition 3 is met. Step 303 is executed when preset condition 2 is met but preset condition 1 is not met. Step 304 is executed when preset condition 1 is met and preset condition 2 is met.

In step 302a, the terminal enters the call service preferred mode.

An operation required to be executed in the call service preferred mode includes: performing a network selection according to a priority sequence of 2G>3G>LTE and cutting off a data connection; and by setting network selection priorities to be 2G>3G>LTE, a network selected by the terminal may preferably ensure normal use of the call service.

In step 302b, the terminal enters the data traffic service preferred mode.

An operation required to be executed in the data traffic service preferred mode includes: performing a network selection according to the priority sequence of LTE>3G>2G, lowering a priority of a current Radio Access Type RAT and immediately performing re-searching/waiting for the terminal to reselect an available network.

In step 302c, the terminal enters the call and data traffic service concurrent mode.

An operation required to be executed in the call and data traffic service concurrent mode includes: performing a network selection according to the priority sequence of LTE>3G>2G; if a current network is an LTE network, whether VoLTE is supported is judged and a WCDMA network is immediately searched for and registration is performed to the WCDMA network, and if the current network is a GSM network, the WCDMA network is immediately searched for and registration is performed to the WCDMA network.

In step 303a, whether the terminal is moving at a high speed is judged.

When the movement speed of the terminal is higher than a preset threshold value or a cell handover frequency of the terminal is higher than a preset threshold value, it is determined that the user is moving at the high speed. Here, the preset values of the movement speed of the terminal and the cell handover frequency of the terminal may be set according to a requirement. For example, the preset threshold value of the movement speed of the terminal may be set to be 40 kilometers/hour; and the preset threshold value of the cell handover frequency of the terminal may be set to be 3/minute.

If it is determined that the terminal is moving at the high speed according to the abovementioned manner, step 305a is executed. If it is determined that the terminal is not moving at the high speed according to the abovementioned manner, Step 304a is executed.

In step 305a, the terminal enters the mobile mode.

At this moment, the terminal executes an operation in the mobile mode on the basis of having executed the operation in the call service preferred mode. Main operations required to be executed in the mobile mode includes: preferably selecting a low-frequency-range cell, and in addition, at least one of the following operations may also be executed: rejecting an incoming call, rejecting the incoming call and replying a preset content, and automatically replying a short message.

In a high-speed movement state of the terminal, for a higher-frequency-range cell, coverage is narrower if more attenuation is generated along with high-speed movement, and a cell reselection probability of the terminal is higher under such a condition. Therefore, an important setting in the mobile mode is preferably selecting the low-frequency-range cell to reduce attenuation of a signal generated along with high-speed movement, widen the coverage and also avoid frequent cell reselection.

In step 308a, whether there is a game being played on the terminal is judged.

A specific judgment method in the step is the same as that in step 206, and will not be elaborated herein.

Step 309a is executed when it is determined that a certain game is being played on the terminal. Otherwise, step 310a is executed to end the current flow.

In step 309a, the terminal enters the game mode.

An operation required to be executed in the game mode is the same as that in the step 207, and will not be elaborated herein.

In step 304a, whether there is a game being played on the terminal is judged.

A specific judgment method in the step is the same as that in the step 206, and will not be elaborated herein.

When it is determined that a certain game is being played on the terminal, step 306a is executed. Otherwise, step 307a is executed to end the current flow.

In step 309a, the terminal enters the game mode.

An operation required to be executed in the game mode is the same as that in the step 207, and will not be elaborated herein.

From FIG. 3, it can be seen that steps 303b-310b executed after the terminal enters the data traffic service preferred mode and steps 303c-310c executed after the terminal enters the call and data traffic service concurrent mode sequentially correspond to steps 303a-310a executed after the terminal enters the call service preferred mode respectively, and the executed operations are the same as those in steps 303a-310a, and thus the operations will not be elaborated herein.

After the preferred working mode of the terminal is determined according to the abovementioned processing flow of step 102, the method further includes that: judging whether the terminal is in low battery. The judgment method belongs to a related art, and will not be elaborated herein. When it is determined that the terminal is in low battery, a prompting interface is set to prompt the user whether to keep the current working mode or switch to the power-saving mode. An operation required to be executed in the power-saving mode is the same as that in step 205, and will not be elaborated herein.

In step 103, the terminal is switched to the preferred working mode.

When it is determined that the terminal enters the preferred working mode such as the conference mode, or the power-saving mode, or the call service preferred mode, or the data traffic service preferred mode, or the call and data traffic service concurrent mode, or the game mode, or the mobile mode, or the like, the working mode of the terminal is switched to the preferred working mode to execute an operation flow required to be executed in the corresponding preferred working mode.

Figure 4:
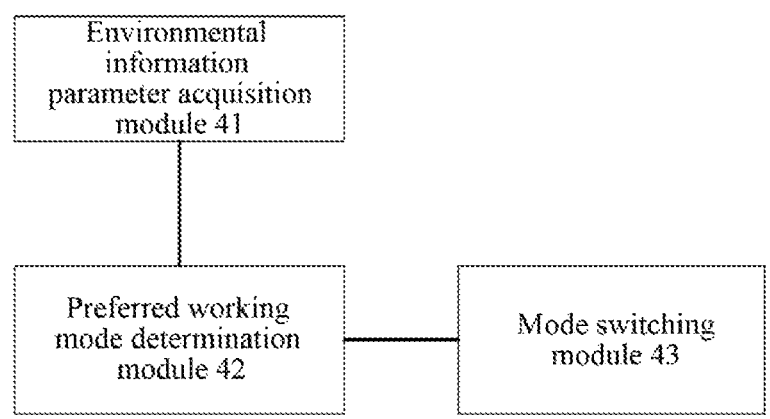
FIG. 4 is a structure diagram of a device for regulating a working mode of a terminal according to an embodiment of the present disclosure.

To implement the abovementioned method, the embodiment of the present disclosure further provides a device for regulating a working mode of a terminal. As shown in FIG. 4, the device includes: an environmental information parameter acquisition module 41, a preferred working mode determination module 42 and a mode switching module 43. Herein:

The environmental information parameter acquisition module 41 is arranged to acquire an environmental information parameter.

The preferred working mode determination module 42 is arranged to determine a preferred working mode according to the environmental information parameter.

The mode switching module 43 is arranged to execute a mode switching after the preferred working mode is determined.

The environmental information parameter includes: a sensor parameter and a network information parameter.

The sensor parameter includes: a movement speed of the terminal, an on time and frequency of a screen and a quantity of power of the terminal; and the network information parameter includes: a time length and frequency of a voice call, a time length and traffic of a data traffic service and a using state of a data connection service.

The preferred working mode includes at least one of the following modes: a conference mode, a power-saving mode, a call service preferred mode, a data traffic service preferred mode, a call and data traffic service concurrent mode, a game mode and a mobile mode.

The operation that the preferred working mode determination module 42 determines the preferred working mode of the terminal includes that:
whether the terminal is operated is judged;
the terminal is determined to enter the conference mode when the terminal is not operated;
whether the terminal requires a call service and/or the data traffic service is judged when the terminal is operated;
the terminal is determined to enter the power-saving mode when the terminal does not require the call service and/or the data traffic service;
whether there is a game being played on the terminal is judged after the terminal enters the power-saving mode;
the terminal is determined to enter the game mode when a certain game is being played on the terminal; and
a current flow is ended when no game is being played on the terminal.

The operation that the preferred working mode determination module 42 determines the preferred working mode of the terminal further includes that:
whether the network information parameter meets a preset condition is judged when the terminal requires the call service and/or the data traffic service;
herein, the preset condition includes that: preset condition 1: a historical call frequency of the terminal is higher than a preset threshold value, preset condition 2: a historical data traffic service using frequency of the terminal is higher than a preset threshold value, and preset condition 3: the using state of the data connection service is connection;
the terminal is determined to enter the call service preferred mode when preset condition 1 is met but preset condition 2 is not met, or, preset condition 3 is met; the terminal is determined to enter the data traffic service preferred mode when preset condition 2 is met but preset condition 1 is not met; and the terminal is determined to enter the call and data traffic service concurrent mode when preset condition 1 is met and preset condition 2 is met.

After the terminal enters the call service preferred mode, or the data traffic service preferred mode, or the call and data traffic service concurrent mode, the operation that the preferred working mode determination module 42 determines the preferred working mode of the terminal further includes that:
whether the terminal is moving at a high speed is judged;
the terminal is determined to enter the mobile mode when the terminal is moving at a high speed;
whether there is a game being played on the terminal is judged;
the terminal is determined to enter the game mode when a certain game is being played on the terminal, otherwise the current flow is ended;
whether there is a game being played on the terminal is judged when the terminal is not moving at the high speed; and the terminal is determined to enter the game mode when a certain game is being played on the terminal, otherwise the current flow is ended.

When it is determined that the terminal enters the preferred working mode such as the conference mode, or the power-saving mode, or the call service preferred mode, or the data traffic service preferred mode, or the call and data traffic service concurrent mode, or the game mode, or the mobile mode, or the like, the mode switching module 43 switches the terminal to the corresponding preferred working mode to execute an operation flow required to be executed by the terminal in the corresponding preferred working mode.

In a specific implementation process, the environmental information parameter acquisition module 41, the preferred working mode determination module 42 and the mode switching module 43 may be implemented by a Central Processing Unit CPU, Micro Processing Unit MPU, Digital Signal Processor DSP or Field Programmable Gate Array FPGA in the terminal in practice.

To implement the abovementioned method, the embodiment of the present disclosure further provides a terminal, which includes the abovementioned device for regulating the working mode of the terminal.

The embodiment of the present disclosure further provides a computer-readable storage medium, which includes a set of computer-executable instructions. Herein, the instructions are configured to execute the method for regulating the working mode of the terminal provided by any abovementioned embodiment of the present disclosure.

Those skilled the art should know that the embodiment of the present disclosure may be provided as a method, a system or a computer program product. Therefore, the present disclosure may adopt a form of hardware embodiment, software embodiment or combined software and hardware embodiment. Moreover, the present disclosure may adopt a form of computer program product implemented on one or more computer-available storage media (including, but not limited to, a disk memory and an optical memory, etc.) including computer-available program codes.

The present disclosure is described with reference to flowcharts and/or block diagrams of the method, equipment (system) and computer program product according to the embodiment of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable equipment to generate processing implemented by the computer, thereby steps for realizing the function specified in one flow or many flows in the flowcharts and/or one block or many blocks in the block diagrams are provided by the instructions executed on the computer or the other programmable equipment.

The above is only the preferred embodiment of the present disclosure and not intended to limit the scope of protection of the present disclosure.

I claim:

1. A method for regulating a working mode of a terminal, comprising:
    acquiring an environmental information parameter of the terminal, determining a preferred working mode of the terminal according to the environmental information parameter, and switching to the preferred working mode,
    wherein, said determining a preferred working mode of the terminal comprises:
    judging whether the terminal is operated;
    determining the terminal to enter a conference mode when the terminal is not operated;
    judging whether the terminal requires a call service and/or a data traffic service when the terminal is operated;
    determining the terminal to enter a power-saving mode when the terminal does not require the call service and/or the data traffic service;
    judging whether there is a game being played on the terminal after the terminal enters the power-saving mode;
    determining the terminal to enter a game mode when a certain game is being played on the terminal; and
    ending a current flow when no game is being played on the terminal,
    wherein the environmental information parameter comprises: a sensor parameter and a network information parameter;
    the sensor parameter comprises: a movement speed of the terminal, an on time and frequency of a screen and a quantity of power of the terminal; and
    the network information parameter comprises: a time length and frequency of a voice call, a time length and traffic of a data traffic service and a using state of a data connection service.

2. The method according to claim 1, wherein the preferred working mode comprises at least one of the following modes: the conference mode, the power-saving mode, a call service preferred mode, a data traffic service preferred mode, a call and data traffic service concurrent mode, the game mode and a mobile mode.

3. The method according to claim 1, wherein, the method further comprises:
    judging whether the network information parameter meets a preset condition when the terminal requires the call service and/or the data traffic service;
    wherein, the preset condition comprises: preset condition 1: a historical call frequency of the terminal is higher than a preset threshold value, preset condition 2: a historical data traffic service using frequency of the terminal is higher than a preset threshold value, and preset condition 3: the using state of the data connection service is connection;
    determining the terminal to enter the call service preferred mode when preset condition 1 is met but preset condition 2 is not met, or, preset condition 3 is met; determining the terminal to enter the data traffic service preferred mode when preset condition 2 is met but preset condition 1 is not met; and determining the terminal to enter the call and data traffic service concurrent mode when preset condition 1 is met and preset condition 2 is met.

4. The method according to claim 3, wherein, after the terminal enters the call service preferred mode, or the data traffic service preferred mode, or the call and data traffic service concurrent mode, determining the preferred working mode by a preferred working mode determination module further comprises:

judging whether the terminal is moving at a high speed;
determining the terminal to enter the mobile mode when the terminal is moving at the high speed;
judging whether there is a game being played on the terminal;
determining the terminal to enter the game mode when a certain game is being played on the terminal, otherwise ending the current flow;
judging whether there is a game being played on the terminal when the terminal is not moving at the high speed; and determining the terminal to enter the game mode when a certain game is being played on the terminal, otherwise ending the current flow.

5. A device for regulating a working mode of a terminal, comprising: an environmental information parameter acquisition module, a preferred working mode determination module and a mode switching module, wherein
the environmental information parameter acquisition module is arranged to acquire an environmental information parameter;
the preferred working mode determination module is arranged to determine a preferred working mode according to the environmental information parameter; and
the mode switching module is arranged to execute a mode switching after the preferred working mode is determined,
wherein, determining the preferred working mode by the preferred working mode determination module comprises:
judging whether the terminal is operated;
determining the terminal to enter a conference mode when the terminal is not operated;
judging whether the terminal requires a call service and/or a data traffic service when the terminal is operated;
determining the terminal to enter a power-saving mode when the terminal does not require the call service and/or the data traffic service;
judging whether there is a game being played on the terminal after the terminal enters the power-saving mode;
determining the terminal to enter a game mode when a certain game is being played on the terminal; and
ending a current flow when no game is being played on the terminal,
wherein the environmental information parameter comprises: a sensor parameter and a network information parameter;
the sensor parameter comprises: a movement speed of the terminal, an on time and frequency of a screen and a quantity of power of the terminal; and
the network information parameter comprises: a time length and frequency of a voice call, a time length and traffic of a data traffic service and a using state of a data connection service.

6. The device according to claim 5, wherein the preferred working mode comprises at least one of the following modes: the conference mode, the power-saving mode, a call service preferred mode, a data traffic service preferred mode, a call and data traffic service concurrent mode, the game mode and a mobile mode.

7. The device according to claim 5, wherein, determining the preferred working mode by the preferred working mode determination module further comprises:
judging whether the network information parameter meets a preset condition when the terminal requires the call service and/or the data traffic service,
wherein, the preset condition comprises: preset condition 1: a historical call frequency of the terminal is higher than a preset threshold value, preset condition 2: a historical data traffic service using frequency of the terminal is higher than a preset threshold value, and preset condition 3: the using state of the data connection service is connection;
determining the terminal to enter the call service preferred mode when preset condition 1 is met but preset condition 2 is not met, or, preset condition 3 is met;
determining the terminal to enter the data traffic service preferred mode when preset condition 2 is met but preset condition 1 is not met; and determining the terminal to enter the call and data traffic service concurrent mode when preset condition 1 is met and preset condition 2 is met.

8. The device according to claim 7, wherein, after the terminal enters the call service preferred mode, or the data traffic service preferred mode, or the call and data traffic service concurrent mode, determining the preferred working mode by the preferred working mode determination module further comprising:
judging whether the terminal is moving at a high speed;
determining the terminal to enter the mobile mode when the terminal is moving at the high speed;
judging whether there is a game being played on the terminal;
determining the terminal to enter the game mode when a certain game is being played on the terminal, otherwise ending the current flow;
judging whether there is a game being played on the terminal when the terminal is not moving at the high speed; and determining the terminal to enter the game mode when a certain game is being played on the terminal, otherwise, ending the current flow.

9. A non-transitory computer-readable storage medium, comprising a set of computer-executable instructions, wherein the instructions are configured to execute the method for regulating the working mode of the terminal according to claim 1.

10. A non-transitory computer-readable storage medium, comprising a set of computer-executable instructions, wherein the instructions are configured to execute the method for regulating the working mode of the terminal according to claim 2.

11. A non-transitory computer-readable storage medium, comprising a set of computer-executable instructions, wherein the instructions are configured to execute the method for regulating the working mode of the terminal according to claim 3.

12. A non-transitory computer-readable storage medium, comprising a set of computer-executable instructions, wherein the instructions are configured to execute the method for regulating the working mode of the terminal according to claim 4.

* * * * *